United States Patent [19]

Miller et al.

[11] Patent Number: 4,671,848
[45] Date of Patent: Jun. 9, 1987

[54] METHOD FOR LASER-INDUCED REMOVAL OF A SURFACE COATING

[75] Inventors: Richard T. Miller; Yefim P. Sukhman, both of Phoenix, Ariz.

[73] Assignee: General Laser, Inc., Phoenix, Ariz.

[21] Appl. No.: 682,710

[22] Filed: Dec. 17, 1984

[51] Int. Cl.$^4$ .................. B44C 1/22; B23K 26/00
[52] U.S. Cl. .................... 156/643; 156/668; 219/121 LM
[58] Field of Search .............. 156/345, 643, 668, 646; 219/121 P, 121 PD, 121 PE, 121 L, 121 LH, 121 LJ, 121 LM; 204/298, 192 E

[56] References Cited

U.S. PATENT DOCUMENTS

| | | | |
|---|---|---|---|
| 2,953,706 | 4/1960 | Harris et al. | 219/121 L |
| 3,659,332 | 5/1972 | Morrone | 29/427 |
| 4,081,653 | 3/1978 | Koo et al. | 219/121 LM |
| 4,179,599 | 12/1979 | Conrad | 219/121 P |
| 4,357,203 | 11/1982 | Zelez | 156/668 X |

OTHER PUBLICATIONS

Missel et al., "Improvement of Removal Characteristic of Wire Insulation", IBM Tech. Discl. Bulletin, vol. 12, No. 7, Dec. 1969, p. 979.
Piggin, B. P., "Use of Laser to Remove Insulation", IBM Tech. Discl. Bulletin, vol. 11, No. 7, Dec. 1968, p. 872.
Steinfeld et al., "Surface Etching by Laser-Generated Free Radicals", Journal of the Electrochemical Society, vol. 127, No. 2, Jan. 1980, pp. 514, 515.
Iceland, William, "Laser Wire Stripping: Equipment and Operation Notes", Insulation/Circuits, Apr. 1980, pp. 47-50.
Brewer et al., "Laser-Assisted Dry Etching", Solid State Technology, Apr. 1985, pp. 273-278.

*Primary Examiner*—Donald E. Czaja
*Assistant Examiner*—Ramon R. Hoch
*Attorney, Agent, or Firm*—Harry M. Weiss & Associates

[57] ABSTRACT

In order to remove a dielectric coating from a conducting material, a high energy radiation source, such as a laser source, is focused in a region having a predefined relationship with the coating of the conducting material. The focused radiation results in a plasma or ionized region being formed. The coating in the vicinity of the plasma region is removed. The region of the focusing of the radiation is varied spatially to remove the dielectric coating in a pre-selected region of the conducting material. According to one embodiment, the radiation is focused in a region spatially removed from the conducting material in order that the direct radiation does not directly impact the conducting material.

2 Claims, 7 Drawing Figures

METHOD FOR LASER-INDUCED REMOVAL OF A SURFACE COATING

BACKGROUND OF THE INVENTION

1. Field of the Invention

This invention relates generally to the removal of a dielectric coating from the surface of a material and, more particularly, to the removal of an insulating coating from a conducting material by means of a plasma created by a focused laser beam.

2. Discussion of the Related Art

The removal of dielectric coatings from conducting materials can be difficult to achieve. Indeed, dielectric coatings are selected to adhere strongly to the coated material to minimize the inadvertent removal of coatings. A more stringent requirement is that the dielectric coating removal must be sufficiently complete to provide a surface on the conductor that will permit electrical coupling by another conducting material. Abrasive methods are frequently time-consuming and can cause mechanical damage to conducting elements. In addition, caution must be exercised in the use of the abrasive techniques. Otherwise, the removal of dielectric coating can fall outside the desired physical boundary of the conducting material for the coating removal.

Another technique for the removal of an insulating or dielectric coating is the use of solvents, acids or other chemical agents. This technique has become less desirable as subsequent, and still increasing, restrictions on the disposal of toxic materials have resulted from identification of cumulative environmental problems caused by toxic waste disposal. Thus, the use of chemical removal of insulating coatings has become increasingly expensive and frequently results in the dedication of unacceptable amount of resources in an area peripheral to the main business function.

Another technique for the removal of an insulating coating has been the use of radiation heating for the vaporization of the coating. This technique suffers from two problems. First, the impinging radiation must fall within an absorption band of the dielectric coating material to provide efficient heating of the insulation to remove it from the coated material. In addition, the insulating coating is typically deposited on a conducting material, and the electrically conducting material being a good thermal conductor, provides a heat dissipation mechanism in the region of the insulating material in close proximity to the conducting material and can leave residual materials that compromise the ability to couple electrically to other conducting materials. These problems can be overcome with intense sources of radiation. However, when the insulating coating becomes less than half a wavelength of the impinging radiation, the conducting material supporting the coating imposes a boundary condition for the radiation that limits the power density that can be concentrated in the vicinity of the conductor.

Therefore a need has been felt for apparatus and method of removal of the insulating coating with well-defined physical boundaries which do not leave residual insulating material and which do not produce damage to the conducting material supporting the dielectric material.

SUMMARY OF THE INVENTION

It is therefore an object of the present invention to provide an improved apparatus and method for removing an dielectric coating from a material.

It is another object of the present invention to remove a dielectric coating from a material without use of abrasive techniques.

It is a further object of the present invention to remove an insulating coating from an electrical conductor through use of a laser apparatus.

It is a more particular object of the present invention to remove an insulating coating from a material by focusing a laser beam to cause generation of an ionized region or plasma region in the vicinity of the insulating coating.

The aforementioned and other objects are accomplished, according to the present invention, by generating a laser-induced ionized region or plasma region in the vicinity of the conducting material. The high temperature produced by the laser-induced plasma region will remove the coating in the vicinity of the region of the plasma. A plasma region can be generated by focusing laser radiation into a confined area and producing spontaneous breakup of the electrical components of the atoms and molecules of the ambient or selected atmosphere into an ionized region, typically a plasma. The conducting material is located sufficiently close to the plasma region to remove the coating.

These and other features of the present invention will be understood upon reading of the following description along with the drawings.

DESCRIPTION OF THE PREFERRED EMBODIMENT

Detailed Description of the Figures

Figure 1A:
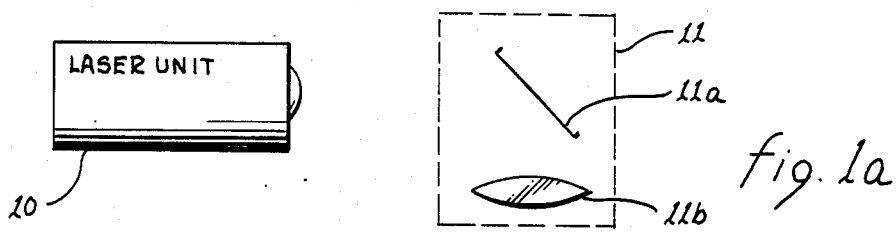
FIG. 1a, 1b, 1c, and 1d are a series of schematic diagrams showing the removal of an insulating coating from a material by means of a laser-induced ionized or plasma region.
Figure 1A:
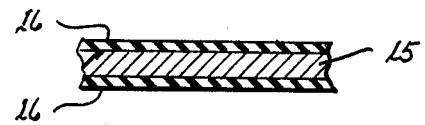
Figure 1B:
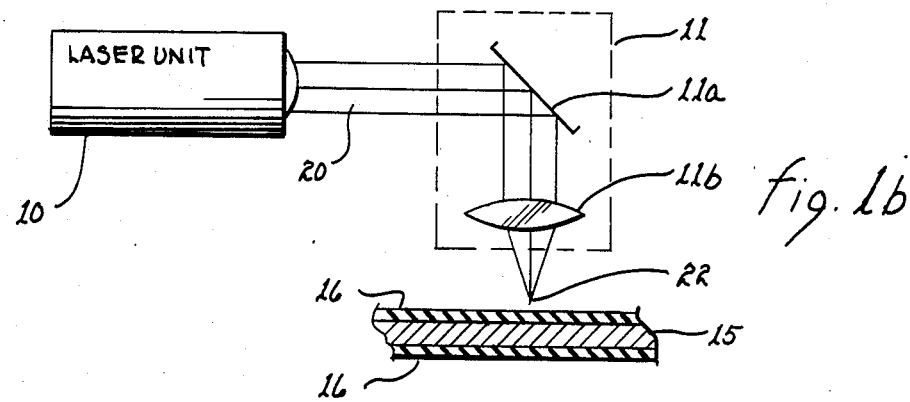
Figure 1C:
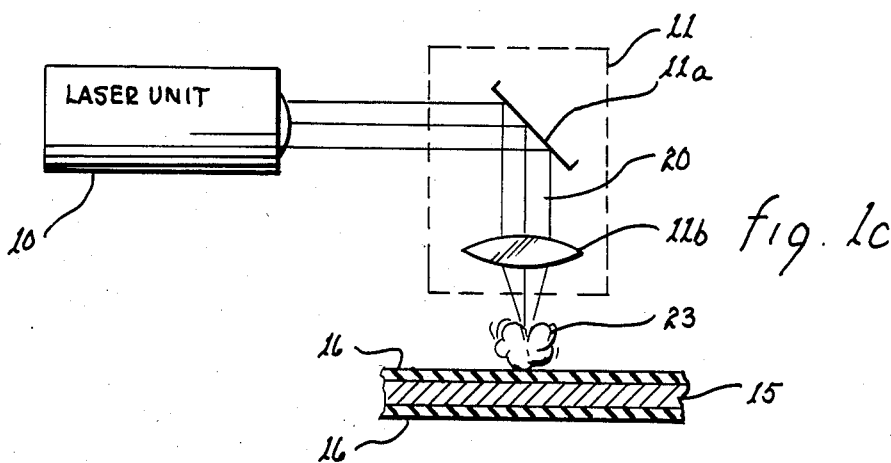
Figure 1D:
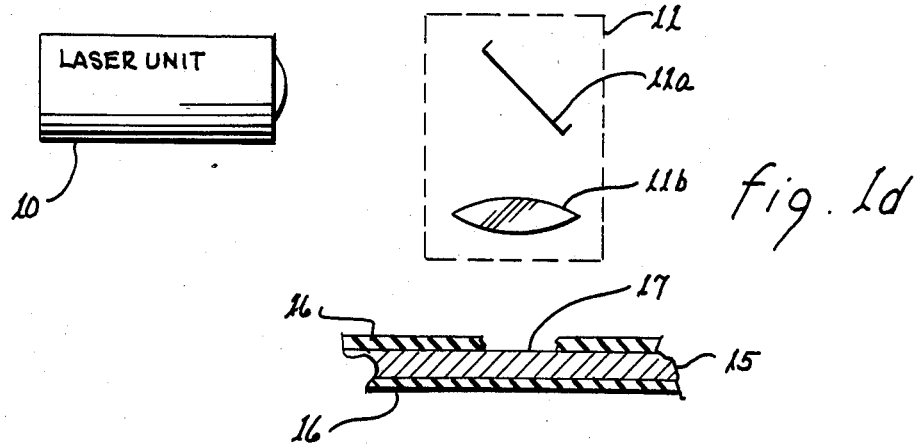

Referring first to FIG. 1a, the arrangement of the various elements for removing a coating from a material is shown. Laser unit 10 and optical system 11 are arranged to provide a focused beam in the vicinity of the coating 16 of the conducting material 15. Optical system 11 can include, for example, a mirror 11a and a lens 11b. In FIG. 1b, the laser unit is schematically shown generating a coherent beam 20 of electromagnetic radiation that impinges upon the optical system 11 and results in a focused laser beam 20 that provides a maximum concentration of energy in the region 22 having a predetermined spatial relationship with the conducting material with the dielectric coating. Referring next to FIG. 1c, the intensity of the radiation in the region 22 results in the establishment of an ionized region 23 in an ambient or pre-selected atmosphere, generally producing a plasma region. And finally, in FIG. 1d the plasma region has removed a portion 17 of the dielectric coating 16 found on conducting material 15. The coherence properties of a laser beam permit a high density of energy to concentrate, by the optical system, in a confined region. It will be clear that non-coherent radiation sources of sufficient intensity can replace the laser unit.

Figure 2A:
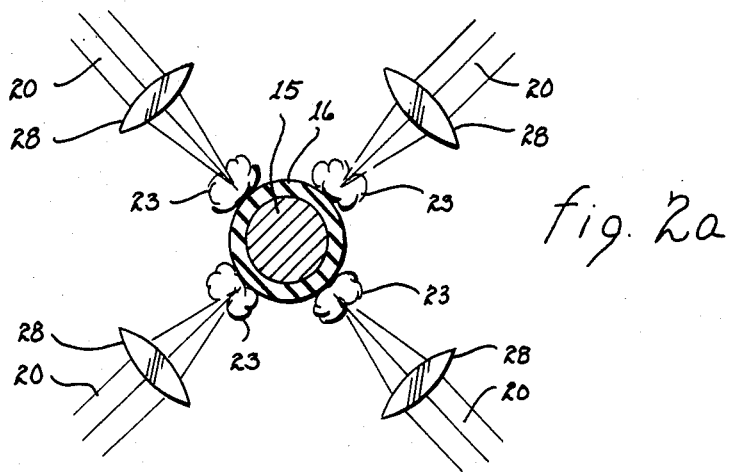
FIG. 2a and FIG. 2b illustrate apparatus for removing a dielectric coating from conducting material over an extended region.

Referring to FIG. 2a, in order to remove a dielectric coating around the circumference of a conducting material, a plurality of laser radiation beams 20 are focused via a plurality of optical systems, illustrated as lenses 28, in the vicinity of a conducting material with dielectric coating 16. The focused beam produces a multiplicity of plasma regions 23 which result in removal of dielectric coating around the entire circumference of the conductor. Illustrated in this embodiment is a circular conducting material, however it will be clear that other geometries for conducting materials can be accommodated by can be generated in a sequence or can be generated simultaneously for all the regions depending on the optical system and on the available power in the laser unit.

Figure 2B:
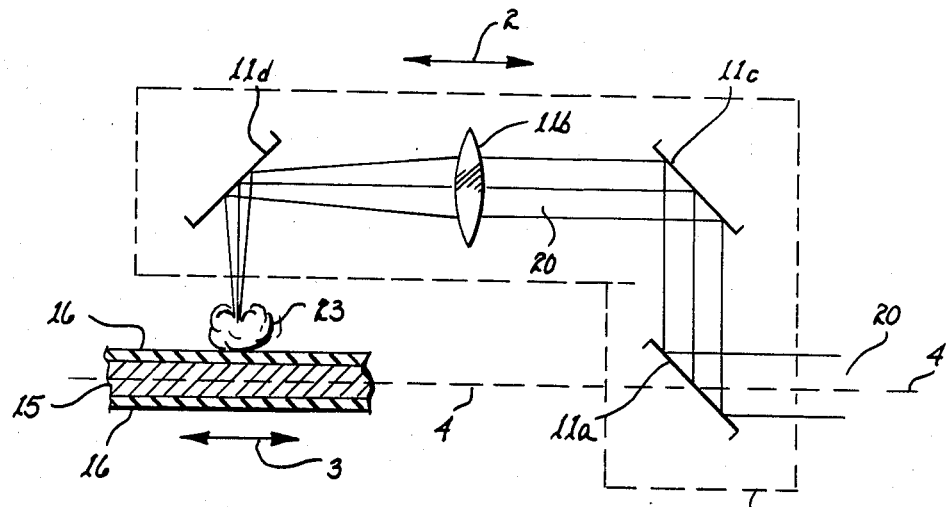

Referring to FIG. 2b, a different optical configuration for removal of a dielectric coating over an extended region is shown. The optical system consists of a mirror 11a along the axis of the laser beam, a second mirror 11c, a lens 11b and a mirror 11d. The optic system focuses the laser beam in the vicinity of the conducting material 15 generating a plasma region 23. The optical system 11, or selected portions thereof can be moved in the directions indicated by the arrow 2. In the alternative, the conducting material 15 can be moved as shown by the arrows 3 to remove the dielectric coating from an extended region. In addition, the optical system 11 can be rotated about the optic axis 4 to remove the dielectric coating on a circumference of the conducting material 15. It will be clear that the conducting material 15 can be rotated instead of optical system 11 or can be rotated in connection with optical system 11 to remove dielectric coatings from the circumference of the conducting material. Similarly, it will be clear in FIG. 2a that either the optical system represented by the lenses 28 and/or the conducting material 15 can be moved perpendicular to the cross-section plane to remove a dielectric over an extended region.

Figure 3:
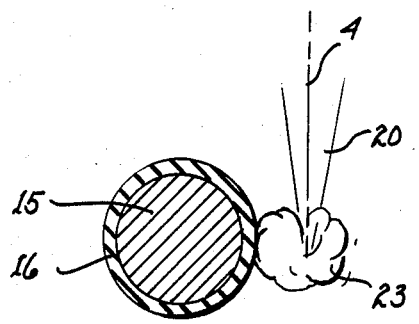
FIG. 3 is a schematic diagram demonstrating removal of a dielectric coating by a laser-induced plasma region when the conductor is not along an optic axis.

Referring next to FIG. 3, the laser-induced plasma region 23 produced by the laser beam 20 can remove the dielectric material 16 on conducting materials when the conducting material is not directly on the optic axis. This configuration reduces the radiation directly impinging on the conducting material.

Operation of the Preferred Embodiment

The removal of an insulating coating from conducting materials has proven to be difficult to accomplish. Dielectric materials such as the Polyimides and, especially, the PYRE-ML wire enamel and the Kapton insulating coatings have proven especially difficult to remove. The normal techniques of abrasive removal, chemical removal, or application of a thermal energy to the insulating coating have proven unsatisfactory for dielectric coating removal of these materials. It has been found that the use of a plasma region effectively removes the insulating coating from the conducting material. The thermal conductivity of the conducting material is sufficiently greater than the thermal conductivity of the insulating material so that even at the point that the insulating material is being removed, the conducting material can remain unaffected by the presence of the plasma region, when an appropriate spatial relationship is maintained. A high power laser, such as a TEA laser, an Eximer laser or any of the high intensity laser devices, can produce a beam that can be focused onto a region near the insulating coating to be removed. Typically, the laser beam is pulsed to provide the high energy density of the pulsed-laser technique. The generation of the plasma region by the laser beam can interfere with the continuing plasma generation process because the plasma region can absorb the laser radiation. The focused laser beam provides sufficiently high electric fields and/or sufficient thermal energy to cause intense heating of the ambient or preselected atmosphere and this thermal energy is transferred to the insulating coating. In addition, the thermal energy of the plasma region is such that the energetic particles may participate in the removal of the insulating coating. It is found that the condition for insulating coating removal wherein the conducting material is relatively unaffected by the plasma region can result in only a limited region of the conductor having the insulating coating removed. It is found that three exposures to the plasma, removing insulation over approximately 120° of a circular conducting lead for each exposure will remove sufficient amount of the coating for effective electrical coupling.

It has been found that, for intense radiation sources, damage can occur to the conducting material. To eliminate this problem, the conducting material can be located off the optic axis as shown in FIG. 3. The off-axis laser-generated plasma can permit two sides of a circular conduction to have the dielectric coating removed without motion of the conductor by varying the focused the laser beam.

The above description is included to illustrate the preferred embodiment and is not means to limit the scope of the invention. The scope of the invention is to be limited only by the following claims. From the above discussion, many variations will be apparent to one skilled in the art that would yet be encompassed by the spirit and scope of the invention.

What is claimed is:

1. A method for removing a portion of a thin enamel insulation coating including polyimide insulation coating located on an electrically conductive wire comprising:

provide at least one electrically conductive wire having a thin enamel insulation coating including a polyimide insulation coating located as an electrical insulation coating around said conductive wire;

providing laser means for generating a laser beam;

focusing said laser beam in region adjacent to said thin insulation coating on said electrically conductive wire, said laser beam having sufficient intensity to cause a plasma region to form in air in said region and, whereby said plasma region removes a portion of said thin enamel insulation coating including a polyimide insulation coating in a circumferential direction around said electrically conductive wire.

2. The method of claim 1 including the step of varying said plasma region along a length of said electrically conductive wire for removing said thin enamel insulation coating including a polyimide insulation coating along said length of said electrically conductive wire.

* * * * *